Jan. 15, 1963  C. M. ALBRIGHT, JR., ETAL  3,073,719
SPRAY METHOD FOR MAKING METALLIC FLAKE PIGMENTED FILMS
Filed Sept. 20, 1945
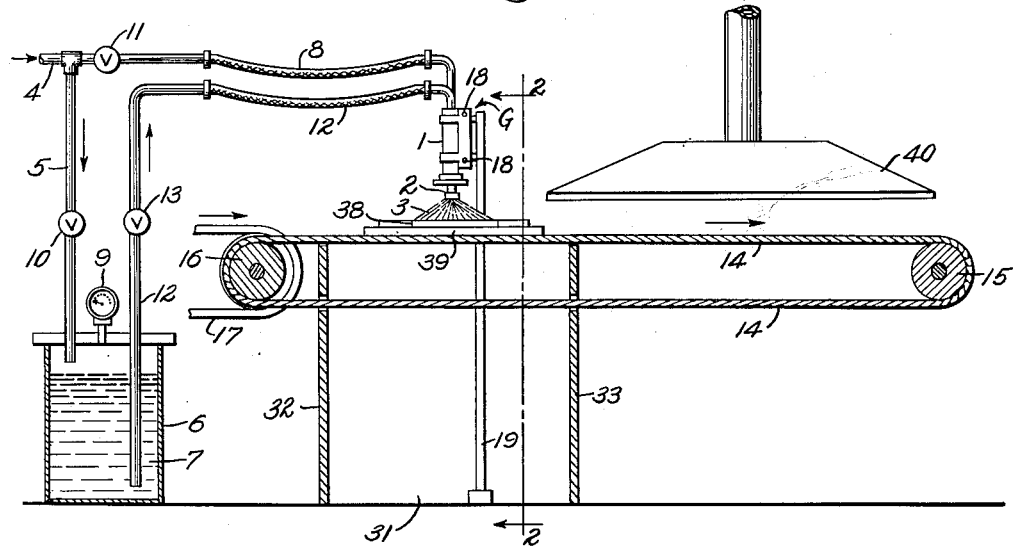
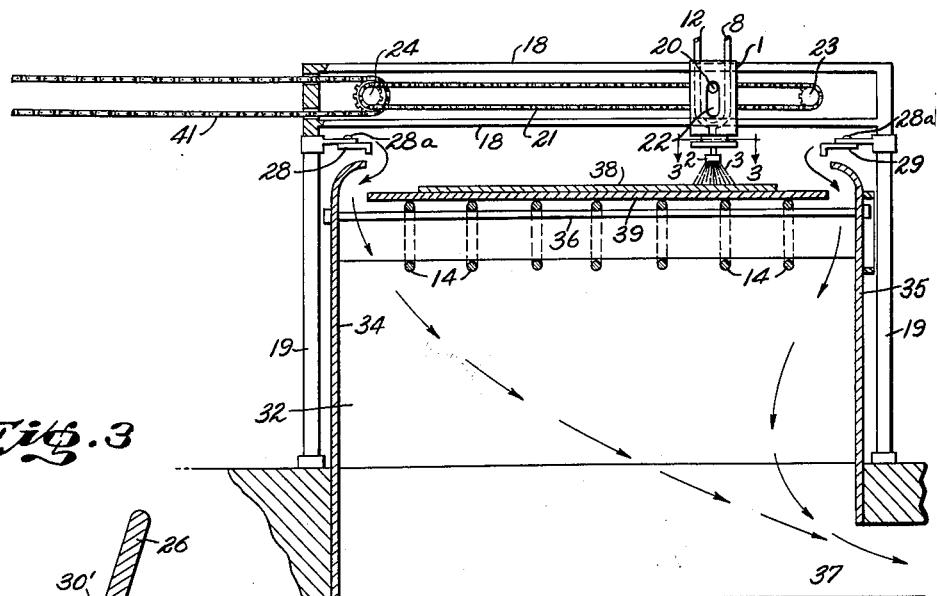
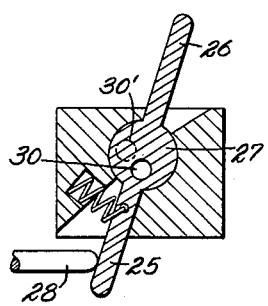
Inventors
ARTHUR W. LARCHAR
CLAYTON M. ALBRIGHT, JR.
BY R. F. Miller
Attorney

3,073,719
SPRAY METHOD FOR MAKING METALLIC FLAKE PIGMENTED FILMS
Clayton M. Albright, Jr., Wallingford, and Arthur Whitney Larchar, Mendenhall, Pa., assignors to E. I. du Pont de Nemours & Company, Wilmington, Del., a corporation of Delaware
Filed Sept. 20, 1945, Ser. No. 617,626
7 Claims. (Cl. 117—105)

This invention relates to metal-pigmented films having improved properties and to a method for preparing them.

Films composed of organic polymers pigmented with metallic flakes have a number of properties which make them of considerable value in certain applications. One such application for which these films are especially valuable is that in which they are used to modify or absorb electromagnetic radiations having a frequency of $10^6$ to $10^{11}$ cycles per second which strike the film. In this specific application optimum modification of the radiations is obtained when the metallic flakes are highly oriented in the plane of the film, i.e., the flakes are substantially all oriented with their surfaces of major area in the plane of the film. When such planar oriented films are produced by a process such as knifing, the individual flakes, which are not uniform in shape and may be rectangular or elongated, are also oriented with respect to the direction of their longest dimension, a major proportion of the flakes having their longest dimension in a direction different from that of the remainder. When plane polarized electromagnetic radiations perpendicularly strike a film containing metallic flakes oriented in this manner they are modified or absorbed to varying degrees when the film is rotated 90° in its plane. Such films are termed "directional" because of this effect. When metallic flake-pigmented films are prepared by ordinary automatic machine spraying procedures the flake-pigmented composition is deposited in thin coats on a support and the flakes orient themselves in the plane of the film. Such sprayed films are less directional than knifed films of the same composition; however, they are still too directional for use in applications where all plane polarized radiations striking the film perpendicularly must be absorbed or modified to substantially the same degree.

This invention has as an object a method for obtaining metallic flake-pigmented film having the property of modifying or absorbing to substantially the same degree all plane polarized electromagnetic radiations striking the surface of the film perpendicularly. Other objects will appear hereinafter.

These objects are accomplished by the invention described herein which comprises the preparation of non-directional metal-pigmented film by spraying onto a sheet material in two directions in the same plane and at substantially right angles, a liquid composition containing a film-forming vehicle and metallic flakes, the number of successive coats sprayed in the same direction being not more than that required to form 10% of the total thickness of the final film. The resulting film is nondirectional in that it possesses, when attached to a metal backing, the property of having substantially the same effect on all plane polarized electromagnetic radiations which strike its surface perpendicularly.

In one embodiment of the invention the cross-spraying is accomplished by spraying one coat of the metallic flake-pigmented composition onto a supporting sheet material, rotating the sheet material 90° after each successive coat, until a composite film of the desired thickness is obtained. A preferred form of the invention is carried out as follows:

A spraying composition is first prepared by dispersing a metallic flake pigment and an organic film-forming polymer in a volatile solvent. This composition is sprayed downward onto a sheet material from an automatic spray gun which is moved transversely back and forth over the surface of the supporting material while this material is being continually moved forward. The various factors in spraying technique, such as the volume of liquid supplied to the gun, the atomizing air pressure, the distance of the spray gun from the film support, the width of the spray pattern, the rate of motion of the spray gun, and the speed of the film support on the conveyor, are adjusted precisely so that a film of extremely uniform thickness is formed on the sheet material. The resulting coat of paint is dried about 10 minutes and the supporting sheet material is then rotated 90° in the plane of the film and sprayed again in the same manner. This process is repeated until a sufficient number of coats is applied to produce a composite film of the desired thickness, the orientation in each alternate coat being at right angles to that in adjacent coats. After the final coat is applied the film is dried overnight at room temperature, stripped from the supporting sheet material, if desired, and dried at elevated temperature to remove residual solvent. The resulting film, when applied to a metal backing, has the same effect on all plane polarized electromagnetic radiations which strike its surface perpendicularly.

The compositions applied by the cross-spraying process of this invention can be any metallic flake-pigmented film-forming composition which is capable of being sprayed. Any of the known methods for preparing metallic flake-pigmented paint compositions may be employed. The following method is very satisfactory for preparing paints for use in the cross-spraying process of this invention. A butadiene/styrene interpolymer is compounded with the following ingredients in the indicated proportions:

| | |
|---|---|
| Butadiene/styrene interpolymer (synthetic rubber of the type known as GR-S)_____parts by weight__ | 100 |
| Zinc xylyl mercaptide (50% solution in equal parts of xylene and isopropanol)_____parts__ | 1 |
| Phenyl alpha-naphthylamine_____do____ | 1 |
| Zinc oxide_____do____ | 5 |
| 2-mercaptothiazoline _____do____ | 1.5 |
| Sulfur _____do____ | 2 |

The zinc xylyl mercaptide is first worked into the butadiene/styrene interpolymer in a rubber mill with tight rolls at 82–93° C. for 10 minutes. The rolls are then loosened and the compound is slabbed off, spread out on holland cloth and allowed to cool at room temperature. The cooled rubber is then placed in a cold rubber mill with water-cooled rolls and milling continued. After 1 minute the phenyl alpha-naphthylamine is added and worked in by milling for about 2 minutes. The zinc oxide is added and worked in by milling for about 4 minutes. The mercaptothiazoline is then added and worked in by milling for about 2 minutes. The sulfur is finally added and worked in by milling for about 3 minutes. The product is then slabbed off in thick sheets and allowed to cool on holland cloth at room temperature. The compounded rubber is dispersed in xylene to form a cement, containing about 17.5% solids, as follows: A container fitted with a paddle-type stirrer is charged with 222 parts of xylene and 55 parts of the compounded rubber (which has previously been cut into pieces about 2 inches x 4 inches in size) and the ingredients are stirred 18 hours at room temperature. Another 36 parts of xylene is added and the dispersion stirred 2 hours more. The resulting cement is strained through a 4-mesh wire screen and is ready for use in the preparation of a metal-pigmented paint having the following composition:

| | Parts |
|---|---|
| Aluminum flake pigment | 122 |
| Aliphatic petroleum fraction having a boiling range of 88–131° C | 528 |
| Rubber cement (17.5% solids, prepared as described above) | 208 |
| Xylene | 198 |

The xylene and two-thirds of the rubber cement are placed in a container fitted with a paddle-type stirrer. Stirring is started and the aluminum flake pigment added gradually, the mixture being stirred 10 minutes after all the pigment is added. The remaining one-third of the cement is added and the resulting concentrated premix (30% solids) is stirred for 4 hours. The aliphatic petroleum fraction is then added and the dispersion stirred for 2 hours. The resulting paint containing 15% solids composed of aluminum flake and butadiene/styrene synthetic rubber in the ratio of 77:23 dispersed in a solvent mixture composed of xylene and an aliphatic petroleum fraction in a ratio of 41:59, is highly satisfactory for use in the cross-spraying process of this invention.

Spraying compositions produced by the above process, involving the preparation of a concentrated premix followed by dilution to the desired spraying viscosity, give films of higher density than paints of the same composition prepared directly at the same spraying viscosity. Paints prepared by the direct process are entirely satisfactory for use in the preparation of films where the highest density is not required.

Various arrangements and selections of equipment for the operation of the process of this invention are possible. The cross-spraying is conveniently carried out in commercial automatic transverse spray coating machines. These machines comprise the following elements: (a) A conveyor for supporting the flat sheet material, e.g., rigid panels, on which the sprayed film is to be formed and for moving these panels under the spray device; (b) a traversing mechanism designed to carry a spray gun back and forth over the supporting panels at right angles to the direction in which these panels are being moved on the conveyor and having automatic mechanism for turning the spray gun on and off at the beginning and end of each stroke; (c) a spray gun of the type which produces a fan shaped spray and deposits the paint in a roughly rectangular or oblong pattern; (d) an exhaust system to remove overspray and solvent vapors from the film as it dries; and (e) a pressure tank with accurate controls for supplying the metal-pigmented paint to the spray gun under variable conditions.

A spray machine of the above mentioned kind is illustrated in the accompanying drawing wherein:

FIG. 1 is an elevational view showing somewhat diagrammatically suitable spraying equipment in which some of the parts are omitted for the purpose of clarity;

FIG. 2 is a sectional view in the direction of line 2—2 in FIG. 1; and

FIG. 3 is sectional view in the direction of line 3—3 of FIG. 2.

The numeral 1 indicates the carriage of a spray gun G having a nozzle 2 adapted to form a fan-shaped spray 3. The conduit 4 leads to a compressed air source not shown and branches into a line 5 leading into the paint spray pot 6 and terminating above the surface of the liquid 7 therein, and branches into a line 8 leading to the spray gun G. The numeral 9 represents a gauge which indicates the pressure within the paint spray pot and the numerals 10 and 11 represent reducing values in the lines 5 and 8 respectively. A conduit 12 provided with a valve 13 conveys the paint from the paint spray pot to the spray gun G. The lines 8 and 12 are flexible for enough of their length to allow the spray gun G to be moved back and forth through the full width of the machine.

Beneath the nozzle 2 of the spray gun is a conveyor composed of a plurality of cables 14 which pass around two drums 15 and 16, the latter drum being driven from a pulley belt 17.

The spray gun reciprocates transversely of the conveyor by sliding on bars 18 passing through the gun carriage 1 and supported by standards 19. The spray gun is caused to slide along the bars 18 by means of a pin 20 extending from a chain 21 into a vertical slot 22 in the gun carriage 1. The chain is carried around sprocket wheels 23 and 24, the latter being rotated by a power driven chain 41. As the spray gun approaches the ends of the bar, arms 25 and 26 extending from a plug 27 fitting in the conduit of the upper end of the nozzle, strike projections 28 and 29 attached near the top of standards 19, said projections being adjustable to extend varying distances from the standards 19. For this purpose the projections 28 and 29 can each be formed of two telescoping or sliding sections held in place by a set screw 28a. At each end of the stroke the plug 27 is thereby given an arc of rotation which moves the orifices 30 through the plug out of line with the orifice 30' of the conduit leading into the spray gun G.

An exhaust booth 31 beneath the spray gun is formed by end panels 32 and 33 and by side panels 34 and 35, these latter panels being removed in FIG. 1 and shown in FIG. 2, and the end panel 32 being removed in FIG. 2 and shown, together with end panel 33, in FIG. 1. The conveyor cables pass through the panels 32 and 33 and the upper strands of the cables rest on rollers, one of which is indicated at 36 in FIG. 2, having their ends supported by the panels 34 and 35. A conduit 37 leads from the exhaust booth to an exhaust fan not shown. The film from the spray gun is formed on a rigid panel 38 which rests on an edge guard panel 39 supported by the conveyor cables. The panel 39 extends at least 8.5 inches beyond the edges of the panel 38. The upper ends of the panels 34 and 35 are curved inward to facilitate air draft into the exhaust booth around the edges of panels 38 and 39. A hood 40, connected to a suitable source of exhaust, removes solvent vapors from the film as it travels on the conveyor.

A method of carrying out the invention is illustrated in greater detail by the following examples in which proportions of ingredients are expressed as parts by weight unless otherwise specified.

*Example 1*

A spraying composition is prepared by first dispersing 9.66 parts of aluminum flake pigment in 11.99 parts of xylene, blending this with 21.25 parts of a solution containing 14.5% of compounded butadiene/styrene synthetic rubber and 85.5% xylene until uniform and then diluting this concentrated premix to spraying viscosity by uniformly incorporating 42.5 parts of an aliphatic petroleum fraction having a boiling range of 88–131° C. The resulting paint contains 15% solids in which the pigment/binder ratio is 75:25 and 85% solvent in which the ratio of aliphatic petroleum fraction to xylene is 3:2. A supporting surface for the metal-pigmented film is prepared by cleaning plate glass panels, 56 inches long and 38 inches wide, thoroughly with a 20% aqueous solution of the dioctyl ester of sodium sulfosuccinic acid, rinsing with water, forming a film of polyvinyl alcohol 1 mil thick on the plate by hand spraying two coats of a 4% aqueous solution of polyvinyl alcohol/glycerol (60/40+1% of the dioctyl ester of sodium sulfosuccinic acid) and drying overnight at room temperature. The metal flake-pigmented spraying composition is sprayed downward onto the polyvinyl alcohol-coated glass plate in automatic spraying equipment of the type described above under the following accurately controlled conditions. The edge guard panel previously mentioned extends 8.5 inches beyond the edges of the glass plate. The spray gun is placed in the traversing mechanism and adjusted so that its tip is 5⅜ inches from the surface of the polyvinyl alcohol-coated glass plate. The air pressure on the paint in the spray pot is adjusted to 11.5 lbs./sq.in. The paint is supplied to the gun at the rate of 15.8 fluid ounces per minute. Under these conditions a spray pattern 10.5 inches wide (fan width) is obtained. The conveyor speed is adjusted to 62 inches per minute and the traverse speed of the spray gun is adjusted so that the spray gun makes 26.5 strokes per minute. Under these conditions exactly six layers of paint are applied to the support while it is advancing one fan width. The six-layer coat is dried 4–5 minutes at room temperature (25° C.), the base plate is rotated 90° in the plane of the film and the panel again passed through the machine in the same manner. This process is repeated until a total of 52 coats is applied with the base plate rotated 90° after each coat. After the final coat is applied the film is dried overnight at room temperature; the metal-pigmented film with its polyvinyl alcohol support is stripped from the glass plate; and the polyvinyl alcohol film is then stripped from the metal flake-pigmented film, if necessary after immersion in water. The final film, after drying 24 hours at 70° C. and curing ½ hour at 130° C., has a thickness of 19 mils and is completely nondirectional, i.e., when applied to a metal backing it has the same effect on all plane polarized electromagnetic radiations which strike its surface perpendicularly.

A control film prepared from the same spraying composition and under the same conditions, with the single exception that it is not rotated 90° between coats, is too directional for use in applications where the film must have substantially the same effect on all plane polarized electromagnetic radiations striking its surface perpendicularly.

*Example II*

A spraying composition containing 15% solids composed of aluminum flake and butadiene/styrene synthetic rubber in proportions of 77:23 and 85% of solvent composed of an aliphatic petroleum fraction and xylene in the ratio of 3:2 is prepared by the method described previously. This is sprayed downward onto adhesive-coated aluminum foil by a procedure similar to that described in Example I. The adhesive-coated aluminum foil support is prepared as follows: Aluminum foil 2 mils thick is spread smoothly onto the surface of a rigid aluminum panel and held in position by fastening the edges of the foil to the panel with strips of adhesive tape. A uniform coat of adhesive is applied by spraying onto the surface of the foil a 10% solution in methyl isobutyl ketone of a vinyl chloride/vinyl acetate interpolymer containing 3–5% of maleic acid. After drying, the adhesive-coated aluminum foil temporarily attached to the aluminum panel is placed on the conveyor of an automatic transverse spraying machine. The aluminum-pigmented paint is sprayed onto the foil under the following conditions:

| | |
|---|---|
| Fluid pressure _____lbs./sq.in__ | 10.8 |
| Fluid rate_____fluid oz./min__ | 19.5 |
| Atomizing pressure_____lbs./sq.in__ | 50 |
| Distance from gun to foil_____inches__ | 5.9 |
| Fan width_____do____ | 9.2 |
| Conveyor speed_____in./min__ | 60 |
| Traverse speed_____strokes/min__ | 39 |
| Number of hits (or layers)/coat_____ | 6 |

After drying 10 minutes at room temperature (26.5–33° C.), the panel is rotated 90° in the plane of the film and the process repeated until a total of 27 coats is applied. After drying overnight at room temperature, the adhesive tape is removed from the edge of the aluminum foil and the aluminum panel with the coated foil still in place is dried 48 hours at 70° C. and the film cured by heating it gradually from 70° to 132° during 30 minutes and maintaining it at 132° C. for 30 minutes. After curing, the film is 22.8 mils thick and, when applied to a metal backing, has the property of being completely nondirectional with respect to its effect on plane polarized electromagnetic radiations striking its surface perpendicularly.

*Example III*

A spraying composition is prepared by dispersing 20 parts of aluminum flake pigment, 27 parts of semi-reinforcing furnace black and 53 parts of neoprene (a film-forming polymer of 2-chloro-butadiene-1,3) in a mixture of 217 parts of xylene and 254 parts of an aliphatic petroleum fraction having a boiling range of 88–131° C.

This composition is sprayed downward onto the surface of an adhesive-coated aluminum foil by a procedure similar to that described in Examples I and II. In this case the aluminum foil of 2 mils thickness is temporarily attached to a support as follows. The foil is first bonded to a sheet of paper and the paper in turn bonded to a flat sheet of gypsum wallboard by means of a water-dispersible adhesive. The foil, temporarily attached to the wallboard, is sprayed in the same manner as that described in Example II with a solution prepared by diluting with 120 parts of xylene and 90 parts of methyl isobutyl ketone, 80 parts of a commercial adhesive consisting 13.5% by weight of a 60/40 butadiene/acrylonitrile polymer, 8.3% of thermosetting phenolic resin, 5.5% of pigment, which is chiefly calcium carbonate, and 72.7% methyl ethyl ketone. After drying, a uniform adhesive layer of about 1 mil thickness is obtained. The adhesive-coated foil supported by the gypsum wallboard is placed on the conveyor of an automatic transverse spraying machine. A coat of the above described aluminum-pigmented spraying composition is sprayed downward onto the foil under the following accurately controlled conditions:

| | |
|---|---|
| Fluid pressure _____lbs./sq.in__ | 13.0–13.3 |
| Fluid rate_____fl. ozs./min__ | 19.1 |
| Atomizing pressure_____lbs./sq.in__ | 40 |
| Distance from gun to foil_____inches__ | 5 |
| Fan width_____do____ | 9 |
| Conveyor speed_____in./min__ | 64.3 |
| Traverse speed_____strokes/min__ | 12.8 |
| Number of hits (or layers)/coat_____ | 6 |

After drying 10 minutes at 27° C., the coated aluminum foil on its gypsum wallboard support is rotated 90° in the plane of the film and then sprayed again in the same manner. The process is repeated until 23 coats are applied. After drying at 20° overnight the film thickness is 20.2 mils. Three more coats of paint are applied in the same manner as before and the final film after again drying overnight at 70° C. and after curing at 130° for 1 hour is 23 mils thick. When attached to a metal backing, it is completely non-directional in its effect on plane polarized electromagnetic radiations striking its surface perpendicularly.

The invention has been illustrated by procedures in which the direction of spraying has been changed in alternate coats. While this is preferred for simplicity of operation, it is not absolutely essential for producing nondirectional films. Two or more successive coats can be sprayed in the same direction provided that the total thickness of successive coats having parallel orientation does not exceed 10% of the total thickness of the final film. For example, a nondirectional film of 20 mils thickness may be composed of ten alternate layers of 2 mils thickness with the direction of orientation of such alternate layers at right angles to each other, but with each 2 mils layer being, for example, made up of one sprayed coat of 2 mils thickness or 2 coats of 1 mil thickness sprayed in parallel direction, or 10 coats of 0.2 mil thickness sprayed in parallel direction. In the case of a film of 50 mils final thickness the maximum thickness of any layer composed of successive coats having parallel orientation must not exceed 5 mils.

Instead of rotating the base plate 90° it will be apparent that the cross-spraying described herein can likewise be accomplished by keeping the film and supporting base stationary and changing the line of motion of the spray gun by 90° with respect to its line of motion in applying the preceding coat. The present cross-sprayed film can also be obtained by simultaneously using two spray guns each having a line of motion diagonally across the base plate but at right angles to each other.

The invention has been illustrated with particular reference to the use of a polyvinyl alcohol-coated glass plate and adhesive-coated aluminum foil as the sheet material on which the nondirectional metal-pigmented film is formed. Other supports can be used if desired. The film can be sprayed directly onto glass or rigid metal plates, e.g. steel, copper, or brass, etc. Likewise the film can be formed on metal foils other than aluminum, for example, on tin, copper, or lead foil. In order to obtain a high uniformity in film thickness in cases where foil is used it is necessary for the foil to be temporarily attached to a rigid base plate. In addition to the methods illustrated in the examples for temporarily attaching the foil to a base plate, other methods of doing this can be employed. One such alternative method consists in applying a liquid which wets the base plate and the foil, e.g., water or glycerol, to the surface of the foil and then pressing the moistened surface firmly onto the base plate.

When forming the cross-sprayed film on a metal foil it is usually advantageous to apply a thin uniform layer of an adhesive or primer to the foil before spraying to obtain maximum adhesion of the sprayed film to the foil. Various adhesives may be used for this purpose. A vinyl chloride/vinyl acetate interpolymer containing a small amount, e.g. 3–10% of maleic acid, and the adhesive mentioned in Example III are particularly suitable for joining aluminum-pigmented films to aluminum foil. Other adhesives such as those of the class known as the rubber cements may also be used with aluminum foil. These adhesives can also be used with other metal foils.

The film-forming compositions used in the process of this invention can contain in flake form other metals than aluminum. Examples of such metals include steel, copper, bronze, nickel and the nickel-iron alloy of high electrical permeability containing about 78.5% nickel. In addition to the metallic flake pigments, the spray compositions can contain non-metallic pigments, extenders, reinforcing agents, etc. In the preparation of films having a butadiene elastomer, i.e., a polymer of butadiene having rubber-like properties, as the binder it is advantageous to include extenders and reinforcing agents such as clay and carbon black. The metallic flake is contained in the spraying composition in amount by weight of at least 0.1% and up to 50%.

While the invention has been illustrated with particular reference to specific butadiene elastomers as the vehicles in the cross-sprayed films other film-forming vehicles can be used if desired. Among such vehicles which can be employed are polymers of monoolefinic hydrocarbons such as polyisobutylene, polystyrene, and diene modified polyisobutylene; other butadiene elastomers such as natural rubber, dimethyl butadiene polymers and butadiene/acrylonitrile interpolymers; cellulose derivatives such as ethyl cellulose and cellulose nitrate; halogen-containing polymers such as chlorinated rubber, vinyl chloride/vinyl acetate interpolymers and vinyl chloride/vinylidene chloride interpolymers; and other film-forming polymers such as polyvinyl acetate, polyvinyl acetal, polyvinyl butyral, methyl methacrylate, butyl methacrylate, etc.

A wide variety of solvents can be used in preparing the spraying compositions for use in the process of this invention. The choice of solvent will, of course, depend on the particular binder or vehicle being used and on the evaporation rate desired in the formation of the film. Mixtures of xylene with aliphatic petroleum fractions are particularly well suited as solvents for spraying compositions containing butadiene elastomers as the vehicle. Hydrogenated petroleum naphtha having a boiling range of from 93.3° C. to 135° C. is particularly useful as a solvent since it reduces "popping," i.e., reduces the tendency of the film to form bubbles, during the drying and curing of the multiple-layer films.

When preparing nondirectional films for absorption of electromagnetic radiations it is quite essential that the films have a definite and very uniform thickness. Such films should not vary more than ±1.5% from their predetermined thickness. This thickness uniformity requirement is so strict that all the various factors influencing the thickness of sprayed films must be precisely controlled in order to obtain cross-sprayed films which are suitable for such radiation absorptive applications. These various factors and the methods for controlling them are described below.

Dustiness and waviness in a sprayed film depend to a large extent on such spraying conditions as the ratio of the atomizing air pressure to the fluid pressure and to the volatility of the solvent used. If the ratio of atomizing air pressure to fluid pressure is too high or the solvent too volatile an excessive amount of solvent is evaporated between the gun and the work. There is then very little leveling of the film and the smaller aggregates are deposited relatively dry, thus producing a rough, dusty surface. Air temperature and gun height are also factors to be considered in selecting the best ratio of air to fluid pressures. These factors are especially important if the air and fluid rates are high and the preceding coat is not well set up before coming under the action of the gun again. Waviness is reduced by increasing the distance between the gun and the sprayed film.

The thickness uniformity in the direction in which the conveyor is moved under the spray gun depends greatly on the spray patterns produced by the spray gun. Best results are obtained by using a spray gun having an air cap designed to develop a fan-shaped spray, which when directed perpendicularly onto a flat surface with the gun and surface stationary, deposits paint uniformly in a narrow, roughly rectangular pattern. In establishing necessary spray conditions, a check of the spray pattern for uniformity is one of the first steps to be carried out. This is done by examining the pattern made by spraying a single layer of paint on a glass plate. The presence of dirt in the air cap is a frequent cause of nonuniformity, usually giving a pattern which is heavy on one side. This can be corrected by thoroughly cleaning the cap with a solvent. An excessive ratio of air pressure to fluid pressure gives a pattern with heavy ends, and too low a ratio gives a heavy center. In automatic transverse spraying of flat panels the work must be traversed by the gun at least twice in order to get complete coverage. An exception would be a case in which the gun was turned on only when traveling in one direction. If, when the gun has made a stroke in this direction and has returned to the starting side for a second spray pass, the work has advanced a distance equal to the width of the fan (spray pattern) the second spray pass (third stroke) will lay down a strip which butts exactly with the preceding strip. It is possible in this manner to get complete coverage in one layer and if the paint is distributed uniformly over the width of each fan or pattern a film of uniform thickness will be produced. In practice the gun is spraying when running in both directions, but when conditions have been adjusted for butting in one direction, butting in the other direction follows as a matter of course.

Butting of spray patterns is an essential requisite in the production of films having the high degree of thickness uniformity required for electromagnetic radiation-absorptive films. Another requisite is that the thickness of a film made by a single stroke of the gun be small in relation to the maximum permissible thickness deviation in the final product. Films with good thickness uniformity are built up at the rate of 0.2 mil or less per gun stroke and with butting patterns. In order to meet the second requirement given above and still get a reasonable build-up for each passage through the machine the work is traversed not twice, but usually 6 or 8 times per coat. This requires the butting of each seventh or ninth stroke. With single gun operation the butting of spray patterns is accomplished easily. If, for example, it is desired to apply six layers during each passage through the machine, a glass plate is first run through the machine with the gun in operation during strokes 1 and 7. The plate is then inspected by transmitted light. If the paint is thin in the center the conveyor speed is reduced until the two patterns match. If the patterns overlap thus giving a heavy center, the conveyor is speeded up until the patterns are matched.

The factors involved in matching or butting patterns are conveyor speed, traverse speed, width of spray pattern, and number of layers per pass through the machine. These are related as follows:

$$\frac{W}{S}n = C$$

where W is the width of the pattern in inches, S is the conveyor speed in inches per minute, $n$ is the number of gun strokes per minute, and C is the number of layers per passage under the gun. For butting patterns C must be a whole even number. Adjustments can be made by changing any of these variables, but regulation of the conveyor speed affords the simplest method of control. Since the width of the pattern varies with the fluid rate, atomizing pressure, and condition of the air cap, these variables must also be carefully controlled in order to get good thickness uniformity.

When spraying conditions are adjusted as described in the four preceding paragraphs, films are obtained having satisfactory thickness uniformity in the direction in which the film is passed under the spraying machine. However, other factors must be controlled in order to obtain films having satisfactory thickness uniformity in the transverse direction. In the transverse direction, the thickness profile of a sprayed film has a broad level plateau in the center, amounting to about 50% of the width of the film, which slopes downward toward the edges. This decrease in thickness near the edges is caused by the distortion of the spray pattern by the exhaust draft near the edges of the supporting plate and by the turning on of the spray gun at the beginning of each pass over the support. The amount of film near the edges having unsatisfactory thickness uniformity can be decreased by regulating these factors. The spray gun cut-on mechanism should be adjusted so that the gun is turned on about 8–8.5 inches before the spray hits the edge of the supporting plate. The thickness uniformity is also increased by placing edge-guard panels, extending at least 8.5 inches from the edge of the supporting plate, along both sides of the film-supprting plates on the conveyor. The exhaust draft should also be regulated so that it is equalized on both sides and the total movement of the air over the edges of the panels is the minimum which will prevent health hazards from vaporized solvent. An exhaust draft rate of about 130–140 ft./min. across the edge of the spray station gives optimum results. With all these adjustments made, sprayed films having satisfactory thickness uniformity, i.e., a thickness deviation of not more than ±1.5%, over 80% of the transverse width of the films are obtained.

In preparing films having butadiene elastomers as the vehicle it is necessary to subject the final film to a heating or curing treatment to develop the optimum physical properties in the film. However, such curing treatments sometimes may cause an undesirable change in the average thickness of the films, this change sometimes being an increase and other times being a decrease. In some applications where the average thickness must be held to very close tolerances these changes in thickness resulting from the curing step often are so great that the cured film is unsuitable for the absorption of electromagnetic radiations of the particular range of frequency for which the film is designed. However, cross-sprayed films having the exact predetermined average thickness can be prepared by the following procedure:

The film is built up to a thickness about 2 to 3% less than the predetermined value by the cross-spraying methods described in detail above, dried at about 70° C. and cured at 130–140° C. as described previously. The resulting film is then tested functionally, i.e., for its degree of absorption of the radiations of the specific frequency for which it is designed, and, if the film is not thick enough for optimum absorption, a sufficient number of cross-sprayed coats of the same spray composition is applied to produce the desired thickness. The composite film is again dried at 70° and cured at 140° C., this second curing treatment causing no significant changes in the electrical properties of the previously cured main portion of the film.

An important factor influencing the density of the sprayed film obtained is the amount of air dissolved in the spray composition. When the spray composition is forced by high pressure air, i.e., 40 lbs./sq. in. or higher, to the spray gun, the paint dissolves sufficient air to cause the resultant film to have a low density. Therefore, when high density films are desired, it is preferable to use a maximum air pressure of 10–15 lbs./sq. in, to force the fluid to the spray gun. Other methods for supplying the fluid paint to the gun without introducing air into the paint consist in forcing the paint from the spray pot to the spray gun by a pump, or by allowing the paint to flow by gravity to the spray gun.

As indicated previously, the cross-sprayed films of this invention are particularly useful in applications where all electromagnetic radiations having a frequency within the range of $10^6$ to $10^{11}$ cycles per second and striking the film perpendicularly must be absorbed or modified to substantially the same degree.

As many apparently widely different embodiments of this invention may be made without departing from the spirt and scope thereof, it is to be understood that we do not limit ourselves to the specific embodiments thereof except as defined in the appended claims.

We claim:

1. A method for obtaining a film which, when attached to a metal backing, modifies to substantially the same degree all plane polarized electromagnetic radiations striking the surface of the film perpendicularly, said method comprising spraying on sheet material at least 10 successive coats of a liquid coating composition containing a film-forming vehicle and metal flake pigment until a film of the desired thickness in which the thickness deviation is not more than ±1.5% is obtained, spraying approximately half of said coats on said sheet material with the spray streams forming these coats traversing the sheet material in lines of motion substantially at right angles to those forming the other coats, and spraying in the same direction a number of successive coats not more than that required to form 10% of the total thickness of the final film.

2. The method set forth in claim 1 in which said film-forming vehicle is a butadiene elastomer.

3. The method set forth in claim 1 in which said film-forming vehicle is butadiene/styrene synthetic rubber.

4. The method set forth in claim 1 in which said film-forming vehicle is neoprene.

5. The method set forth in claim 1 in which said metal flake pigment is aluminum flake.

6. A method for obtaining a film which, when attached to a metal backing, modifies to substantially the same degree all plane polarized electromagnetic radiations striking the surface of the film perpendicularly, said method comprising spraying on sheet material at least 10 successive coats of a liquid coating composition containing a film-forming vehicle and metal flake pigment with the lines of motion of the spray streams traversing said sheet material at substantially right angles to each other in alternate coats, and continuing said alternate spraying of said coats until a film of the desired thickness in which the thickness deviation is not more than ±1.5% is obtained.

7. A method for obtaining a film which, when applied to a metal backing, modifies to substantially the same degree all plane polarized electromagnetic radiations striking the surface of the film perpendicularly, said method comprising passing a supporting base at constant speed beneath a spray stream of a liquid coating composition containing a film-forming vehicle and metal flake pigment, reciprocating said spray stream in a plane transverse to the direction of movement of said base, regulating the speed of said base and the speed of reciprocation of said spray stream such that a continuous coating of uniform thickness composed of said composition is applied to said base during its travel past said spray stream, drying said coating, rotating said base 90° in the plane of said coating, and re-passing the base while so rotated with the applied coating thereon beneath the reciprocating spray stream, and repeating the steps of passing the base beneath the spray stream, drying, and rotating the base prior to repassing the base beneath the spray stream until at least 10 successive coats have been applied which forms a film of the desired thickness in which the thickness deviation is not more than ±1.5% is obtained.

References Cited in the file of this patent

UNITED STATES PATENTS

| | | |
|---|---|---|
| 209,625 | Peterson | Nov. 5, 1878 |
| 1,034,761 | Bradley | Aug. 6, 1912 |
| 1,510,654 | Cavanaugh | Oct. 7, 1924 |
| 1,720,232 | North | July 9, 1929 |